(12) United States Patent
Schultes et al.

(10) Patent No.: US 8,119,734 B2
(45) Date of Patent: Feb. 21, 2012

(54) PROCESS FOR PREPARING AQUEOUS DISPERSIONS

(75) Inventors: Klaus Schultes, Wiesbaden (DE);
Thomas Suefke, Erzhausen (DE);
Reiner Mueller, Biebesheim (DE);
Hartmut Schikowsky, Darmstadt (DE);
Werner Hoess, Griesheim (DE)

(73) Assignee: Evonik Roehm GmbH, Darmstadt (DE)

( * ) Notice: Subject to any disclaimer, the term of this patent is extended or adjusted under 35 U.S.C. 154(b) by 937 days.

(21) Appl. No.: 10/539,132

(22) PCT Filed: Oct. 18, 2003

(86) PCT No.: PCT/EP03/11543
§ 371 (c)(1),
(2), (4) Date: Jun. 16, 2005

(87) PCT Pub. No.: WO2004/056893
PCT Pub. Date: Jul. 8, 2004

(65) Prior Publication Data
US 2006/0052515 A1 Mar. 9, 2006

(30) Foreign Application Priority Data
Dec. 19, 2002 (DE) .................. 102 60 089

(51) Int. Cl.
*C08L 31/00* (2006.01)
*C08L 33/00* (2006.01)
*C08L 35/00* (2006.01)
*C08G 18/62* (2006.01)
*C08F 220/18* (2006.01)
*C08F 2/16* (2006.01)
*C08F 2/22* (2006.01)

(52) U.S. Cl. ......... 524/832; 524/800; 524/804; 524/833

(58) Field of Classification Search .................. 524/800, 524/804, 845, 832, 833
See application file for complete search history.

(56) References Cited

U.S. PATENT DOCUMENTS

| | | | |
|---|---|---|---|
| 3,793,402 A * | 2/1974 | Owens | 525/81 |
| 4,173,596 A * | 11/1979 | De Witt | 428/402 |
| 4,180,529 A * | 12/1979 | Hofmann | 525/85 |
| 4,371,677 A * | 2/1983 | Morningstar et al. | 526/80 |
| 4,513,118 A | 4/1985 | Suetterlin et al. | |
| 4,521,568 A | 6/1985 | Mori et al. | |
| 4,542,179 A * | 9/1985 | Falk et al. | 524/432 |
| 4,833,221 A | 5/1989 | Albrecht | |
| 4,914,142 A * | 4/1990 | Takarabe et al. | 523/511 |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,314,965 A | 5/1994 | Kishida et al. | |
| 5,548,033 A | 8/1996 | Vetter et al. | |
| 5,652,316 A | 7/1997 | May et al. | |
| 5,705,189 A | 1/1998 | Lehmann et al. | |
| 5,777,034 A * | 7/1998 | Shah et al. | 525/228 |
| 6,040,387 A | 3/2000 | Albrecht et al. | |
| 6,287,470 B1 | 9/2001 | Vetter et al. | |
| 6,355,712 B1 | 3/2002 | Schultes et al. | |
| 6,576,255 B1 | 6/2003 | Petereit et al. | |
| 6,613,871 B2 | 9/2003 | Hoess et al. | |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 2002/0123568 A1 | 9/2002 | Tajima et al. | |
| 2002/0160042 A1 | 10/2002 | Petereit et al. | |
| 2004/0030046 A1 | 2/2004 | Schultes et al. | |
| 2004/0104501 A1 | 6/2004 | Petereit et al. | |
| 2004/0116567 A1 | 6/2004 | Schmitt et al. | |
| 2005/0065224 A1 | 3/2005 | Menzler et al. | |
| 2005/0080188 A1 | 4/2005 | Schultes et al. | |
| 2005/0124761 A1 | 6/2005 | Schultes et al. | |
| 2005/0267250 A1 | 12/2005 | Theil et al. | |
| 2006/0121248 A1 | 6/2006 | Lorenz et al. | |
| 2006/0175735 A1 | 8/2006 | Hoess et al. | |
| 2007/0066708 A1 | 3/2007 | Goldacker et al. | |
| 2007/0122624 A1 | 5/2007 | Schultes et al. | |
| 2007/0123610 A1 | 5/2007 | Schultes et al. | |
| 2007/0222117 A1 | 9/2007 | Hoess et al. | |
| 2007/0276093 A1 | 11/2007 | Schultes et al. | |
| 2008/0242782 A1 | 10/2008 | Hager et al. | |
| 2008/0248298 A1 | 10/2008 | Numrich et al. | |

FOREIGN PATENT DOCUMENTS

| | | |
|---|---|---|
| DE | 41 36 993 | 5/1993 |
| EP | 0 828 772 | 3/1998 |
| EP | 0 989 144 | 3/2000 |

OTHER PUBLICATIONS

U.S. Appl. No. 10/539,509, filed Jun. 17, 2005, Schultes, et al.
U.S. Appl. No. 10/575,477, filed Apr. 12, 2006, Wicker, et al.
U.S. Appl. No. 10/575,929, filed Apr. 14, 2006, Schultes, et al.
U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwarz-Barac, et al.
U.S. Appl. No. 60/831,222, filed Jul. 17, 2006, Hager, et al.
U.S. Appl. No. 12/094,277, filed May 20, 2008, Schultes, et al.
U.S. Appl. No. 11/970,190, filed Jan. 7, 2008, Schultes, et al.
U.S. Appl. No. 12/300,408, filed Nov. 11, 2008, Hoess, et al.
U.S. Appl. No. 12/436,809, filed May 7, 2009, Schultes, et al.

* cited by examiner

*Primary Examiner* — Karuna P Reddy

(74) *Attorney, Agent, or Firm* — Oblon, Spivak, McClelland, Maier & Neustadt, L.L.P.

(57) ABSTRACT

The present invention relates to a process for preparing aqueous dispersions. The invention also relates to the formation of core-shell particles in aqueous dispersions. The core-shell particles are useful as impact-modifiers for poly(meth)acrylate moulding compositions.

10 Claims, No Drawings

PROCESS FOR PREPARING AQUEOUS DISPERSIONS

The present invention relates to a process for preparing aqueous dispersions. In particular, it relates to a process for preparing, in aqueous dispersion, core-shell particles which can be used for the impact-modification of poly(meth)acrylate moulding compositions.

It has long been known that the impact strength of moulding compositions, in particular of poly(meth)-acrylate moulding compositions, can be improved by adding, to the moulding composition, a suitable amount of what are known as impact modifiers. The use of core-shell particles and/or core-shell-shell particles for this purpose has become established industrially. These generally have an elastomeric phase, and in the case of the core-shell structure here the core is mostly the elastomeric phase, while in the case of a core-shell-shell structure the first shell grafted onto the core is mostly the elastomeric phase.

By way of example, U.S. Pat. No. 3,793,402 discloses toughened moulding compositions, in particular based on poly(meth)acrylate, which comprise from 90 to 4% by weight of a multistage core-shell particle with a hard core, an elastomeric first shell and a hard second shell. Typical main constituents of the core and of the second shell are alkyl methacrylates having from 1 to 4 carbon atoms in the alkyl radical, in particular methyl methacrylate. The first shell is substantially composed of butadiene, substituted butadienes and/or alkyl acrylates having from 1 to 8 carbon atoms in the alkyl radical. However, it may also contain from 0 to 49.9% by weight, in particular from 0.5 to 30% by weight, of copolymerizable monomer units, such as copolymerizable, monoethylenically unsaturated monomer units. According to U.S. Pat. No. 3,793,402, the presence here of from 10 to 25% by weight of copolymerizable, monoethylenically unsaturated monomer units, in particular of styrene, is very particularly advantageous.

The overall diameter of the core-shell particles is in the range from 100 to 300 nm.

The core-shell particles are produced by multistage emulsion polymerization, using thermal initiators, such as persulphates or redox initiator systems. The intention here is that the polymerization takes place at a temperature in the range from 0 to 125° C., in particular in the range from 30 to 95° C.

Similarly, the German Patent Application DE 41 21 652 A1 describes impact modifiers for thermoplastics, such as polymethyl methacrylate, composed of an at least three-phase emulsion polymer, comprising
A) a hard core composed of a crosslinked homo- or copolymer of ethylenically unsaturated monomers capable of free-radical polymerization;
B) an elastomer phase generated in the presence of the core material and having a glass transition temperature not above 10° C., and composed of
  a) an alkyl ester of acrylic acid having from 1 to 8 carbon atoms in the alkyl radical;
  b) at least one crosslinking monomer having two or more polymerizable double bonds in the molecule;
  c) arylalkyl acrylate or arylalkyl methacrylate;
  d) a hard phase generated in the presence of the elastomer phase and composed of a homo- or copolymer of ethylenically unsaturated monomers capable of free-radical polymerization, its glass transition temperature being at least 50° C.

A moulding composition (Example 3) cited by way of example in that publication has an Izod notched impact strength of 6.2 kJ/m$^2$ at room temperature, 4.7 kJ/m$^2$ at −10° C., and 3.7 kJ/m$^2$ at −20° C. The Vicat softening point of that moulding composition is 97° C.

The core-shell particles are likewise prepared by means of multistage emulsion polymerization, using an alkali metal peroxodisulphate or ammonium peroxodisulphate as initiator, and carrying out the polymerization at a temperature in the range from 20 to 100° C., for example at 50° C.

The German Patent Application DE 41 36 993 A1 discloses impact-modified moulding compositions which comprise from 10 to 96% by weight of a polymer based on polymethyl methacrylate and from 4 to 90% by weight of a multistage core-shell-shell particle, using, for the preparation of the core and, respectively, of the second shell, a monomer mixture composed substantially of methyl methacrylate. The monomer mixture for the first shell encompasses from 60 to 89.99% by weight of alkyl acrylate having from 1 to 20 carbon atoms in the alkyl radical and/or cycloalkyl acrylates having from 5 to 8 carbon atoms in the cycloalkyl radical and from 10 to 39.99% by weight of phenylalkyl acrylate having from to 4 carbon atoms in the alkyl radical, and also, where appropriate, other constituents. The average particle diameter of the core-shell-shell particles is in the range from 50 to 1000 nm, in particular in the range from 150 to 400 nm.

According to that publication, the core-shell particles are obtained by a multistage seed latex process which uses ammonium or alkyli [sic] peroxodisulphates, such as potassium peroxodisulphate, or initiator combination systems as polymerization initiators, the intended polymerization temperature being from 50 to 100° C. when use is made of the ammonium and alkyli [sic] peroxodi-sulphates, which require thermal activation.

The European Patent EP 0 828 772 B1 describes the impact-modification of poly(meth)acrylates by multi-stage core-shell particles which are composed of a core, a first shell and, where appropriate, a second shell, and are free from vinylically unsaturated compounds having at least two equally reactive double bonds. In this the case, the core comprises a first (meth)acrylic polymer. The first shell comprises a polymer which has a low glass transition temperature and which encompasses from 0 to 25% by weight, in particular from 5 to 26% [sic] by weight, of a styrenic monomer and from 75 to 100% by weight of a (meth)acrylic monomer which forms a homopolymer with a glass transition temperature of from −75 to −5° C. The second shell present where appropriate comprises a second (meth)acrylic polymer which may be identical with the first (meth)acrylic polymer or may differ therefrom. The overall diameter of the core-shell particles is in the range from 250 to 320 nm.

The core-shell particles are in turn prepared by multi-stage emulsion polymerization at 80° C., using a potas-sium persulphate as initiator.

Although the processes described above are usually used when preparing core-shell particles, they all have the disadvantage that the polymerization have [sic] to be carried out at comparatively low monomer concentration, generally less than 50.0% by weight, in order to obtain the desired particle sizes with a narrow particle size distribution. A polymerization at higher monomer concentration, in contrast, leads in [sic] to a marked broadening of particle size distribution and to the formation of large amounts of coagulate, which significantly impairs the properties of the core-shell particle.

For application, in particular for the impact-modification of moulding compositions, the core-shell particles cannot be used in the form of an aqueous dispersion, but instead have to be isolated from the aqueous dispersion. The low solid content of the aqueous dispersion therefore has a direct adverse effect on the possible use of the abovementioned core-shell particles, because their separation requires major cost for energy and other resources. There is therefore a need for higher-efficiency processes for preparing core-shell particles.

In addition to the emulsion polymers, suspension polymers are also occasionally used for the impact-modification of moulding compositions. The rubber here, for example grafted with polymethyl methacrylate, has relatively fine distribution in the matrix of the moulding composition, for example polymethyl methacrylate. The elastomeric phase is composed of a mostly crosslinked copolymer with a low glass transition temperature below 25° C., which usually contain [sic], as main component, alkyl acrylate units having from 1 to 8 carbon atoms in the alkyl radical, in particular butyl acrylate units. Use is also occasionally made of polybutadiene or polybutadiene copolymers as tough phase.

Although it is true that use of the impact modifiers described above can achieve a significant improvement in notch impact strength, for a wide variety of applications this is still not fully satisfactory. For example, impact-modification at room temperature (23° C.) in particular requires a relatively large amount of these impact modifiers, which in turn leads to significant impairment of the other properties important for applications of the moulding composition, in particular of modulus of elasticity, melt viscosity, Vicat point and by the die swell.

Industry therefore demands impact modifiers which permit sufficient improvement in the notched impact strength of a moulding composition, in particular at room temperature, using minimum amounts of impact modifier, without any noticeable associated impairment in the other important properties of the moulding composition, in particular modulus of elasticity, melt viscosity, Vicat point and die swell. The moulding composition here is intended to have a Charpy notched impact strength (ISO 179) which is preferably at least 6.0 kJ/m$^2$ at 23° C. and is preferably at least 2.5 kJ/m$^2$ at −10° C., a modulus of elasticity (ISO 527-2) which is preferably greater than 1500 MPa, a haze to ASTM D 1003 (1997) which is preferably at most 2.5%, a melt viscosity which is preferably greater than 2000 Pa s and more advantageously below 4500 Pa s, a Vicat softening point which is preferably at least 85° C., more advantageously at least 90° C., in particular at least 93° C., a transmittance (D 65/10°) to DIN 5033/5036 which is preferably at least 88.5%, and a die swell which is preferably in the range from 0 to 20%.

In light of the prior art, it was then a object of the present invention to provide, for moulding composi-tions, in particular for poly(meth)acrylate moulding compositions, impact modifiers which permit improvement of the notched impact strength of moulding compositions, in particular at room temperature, with no noticeable associated impairment of the other moulding composition properties important for applications, in particular modulus of elasticity, melt viscosity, Vicat point and die swell. The moulding compositions are intended to have a Charpy notched impact strength (ISO 179) which is preferably at least 6.0 kJ/m$^2$ at 23° C. and preferably at least 2.5 kJ/m$^2$ at −10° C., a modulus of elasticity (ISO 527-2) which is preferably greater than 1500 MPa, a haze to ASTM D 1003 (1997) which is preferably at most 2.5%, a melt viscosity which is preferably greater than 2000 Pa s and more advantageously below 4500 Pa s, a Vicat softening point which is preferably at least 85° C., more advantageously at least 90° C., in particular at least 93° C., a transmittance (D 65/10°) to DIN 5033/5036 which is preferably at least 88.5%, and a die swell which is preferably in the range from 0 to 20%.

Another object of the present invention was to provide a more efficient process which can prepare core-shell particles which in particular permits less complicated isolation of the core-shell particles.

Another object of the present invention was to be found in the provision of a process which can prepare core-shell particles and which can be carried out simply, on an industrial scale, and at low cost.

A further object underlying the present invention was to provide a process for preparing core-shell particles with maximum narrowness of particle size distribution, preferably with a $P_{80}$ value below 0.22.

Another object of the present invention was to provide a process which can prepare core-shell particles and which minimizes coagulate formation, preferably to less than 5.0% by weight.

Furthermore, another object of the present invention was to provide a process for preparing core-shell particles with a particle radius, measured by the Coulter method, in the range from 150.0 to below 250.0 nm, because these core-shell particles are very particularly suitable for the impact-modification of moulding compositions, in particular of polyalkyl (meth)acrylate moulding composition.

A process for preparing an aqueous dispersion with all of the features of claim 1 of the present Patent achieves these objects, and also achieves other objects which, although not explicitly mentioned, are readily derivable or producible from the circumstances discussed in the above introduction. Advantageous modifications of the procedure of the invention are protected in the subclaims dependent on Claim 1. The product Claim 11, protects the core-shell particles obtainable by the process. Impact-modified poly(meth)acrylic moulding compositions which comprise core-shell particles of the invention are also claimed, as are preferred application sectors for these moulding compositions.

A process for preparing an aqueous dispersion, by
a) using water and emulsifier to form an initial charge,
b) adding from 25.0 to 45.0 parts by weight of a first composition comprising
  A) from 50.0 to 99.9 parts by weight of alkyl methacrylates other than C) having from 1 to 20 carbon atoms in the alkyl radical,
  B) from 0.0 to 40.0 parts by weight of alkyl acrylates other than C) having from 1 to 20 carbon atoms in the alkyl radical,
  C) from 0.1 to 10.0 parts by weight of crosslinking monomers and
  D) from 0.0 to 8.0 parts by weight of styrenic monomers of the general formula (I)

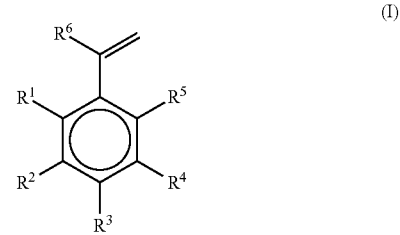

where each of the radicals $R^1$ to $R^5$, independently of the others, is hydrogen, a halogen, a $C_{1-6}$-alkyl group or a $C_{2-6}$-alkenyl group, and the radical $R^6$ is hydrogen or an alkyl group having from 1 to 6 carbon atoms, and polymerizing to a conversion of at least 85.0% by weight, based on the total weight of components A), B), C) and D), c) adding from 35.0 to 55.0 parts by weight of a second composition comprising
   E) from 80.0 to 100.0 parts by weight of (meth)acrylates
   F) from 0.05 to 10.0 parts by weight of cross-linking monomers and
   G) from 0.0 to 20.0 parts by weight of styrenic monomers of the general formula (I),
and polymerizing to a conversion of at least 85.0% by weight, based on the total weight of components E), F) and G), d) adding from 10.0 to 30.0 parts by weight of a third composition comprising
   H) from 50.0 to 100.0 parts by weight of alkyl methacrylates having from 1 to 20 carbon atoms in the alkyl radical,
   I) from 0.0 to 40.0 parts by weight of alkyl acrylates having from 1 to 20 carbon atoms in the alkyl radical and
   J) from 0.0 to 10.0 parts by weight of styrenic monomers of the general formula (I) and polymerizing to a conversion of at least 85.0% by weight, based on the total weight of components H), I) and J), where the parts by weight given for the compositions b), c) and d) give a total of 100.0 parts by weight, a feature of the process being that e) carrying out each polymerization at a temperature in the range from above 60 to below 90° C. and f) selecting the relative proportions of all of the substances in such a way that the total weight of components A) to J), based on the total weight of the aqueous dispersion, is greater than 50.0% by weight, provides an unforeseeable route to a process which permits the efficient preparation of core-shell particles in aqueous dispersion. The high solids content of this aqueous dispersion makes the separation of the core-shell particles substantially easier than in the conventional processes.

A series of other advantages can moreover be achieved through the procedure of the invention. These include:

⇒The process of the invention can be carried out simply on industrial scale and at low cost.

⇒The core-shell particles obtainable by the process of the invention have narrow particle size distribution, preferably a $P_{80}$ value below 0.22.

⇒The process of the invention almost completely suppresses the formation of coagulate.

⇒The process of the invention is particularly suitable for preparing core-shell particles with a particle radius, measured by the Coulter method, in the range from 150.0 to below 250.0 nm.

⇒The process of the invention provides, for moulding compositions, in particular for poly-(meth)acrylate moulding compositions, impact modifiers which permit improvement of the notched impact strength of moulding compositions, in particular at room temperature, with no noticeable associated impairment of the other moulding composition properties important for applications, in particular modulus of elasticity, melt viscosity, Vicat point and die swell. Moulding compositions which are particularly suitable according to the invention has a Charpy notched impact strength (ISO 179) which is preferably at least 6.0 kJ/m² at 23° C. and preferably at least 2.5 kJ/m² at −10° C., a modulus of elasticity (ISO 527-2) which is preferably greater than 1500 MPa, a haze to ASTM D 1003 (1997) which is preferably at most 2.5%, a melt viscosity which is preferably greater than 2000 Pa s and more advantageously below 4500 Pa s, a Vicat softening point which is preferably at least 85° C., more advantageously at least 90° C., in particular at least 93° C., a transmittance (D 65/10°) to DIN 5033/ 5036 which is preferably at least 88.5%, and a die swell which is preferably in the range from 0 to 20%.

⇒Use of the core-shell particles provides access to moulding compositions with significantly improved notched impact strength values, in particular at low temperatures below 0° C., advantageously moulding compositions with an Izod notched impact strength to ISO 180 of at least 3.5 kJ/m² at −10° C.

⇒A comparison is made with conventional impact modifiers, significantly smaller amounts of the core-shell particles of the invention are sufficient to give moulding compositions with comparable notched impact strength at room temperature, in particular at 23° C.

⇒The moulding compositions impact-modified in the manner of the invention feature a significantly improved property profile at room temperature, in particular at 23° C. This makes them useful for applications these [sic] temperatures, in particular at temperatures in the range from 0° C. to 50° C.

According to the present invention, an aqueous dispersion is prepared by a process in which water and emulsifier are used to form an initial charge. This initial charge preferably comprises from 90.00 to 99.9 parts by weight of water and from 0.01 to 10.00 parts by weight of emulsifier, where the stated parts by weight advantageously give a total of 100.00 parts by weight.

The following sequence of steps is now applied to this initial charge b) adding from 25.0 to 45.0 parts by weight of a first composition and polymerizing to a conversion of at least 85.0% by weight, preferably at least 90.0% by weight, advantageously at least 95.0% by weight, in particular at least 99% by weight, based in each case on the total weight of components A), B), C) and D), c) adding from 35.0 to 55.0 parts by weight of a second composition and polymerizing to a conversion of at least 85.0% by weight, preferably at least 90.0% by weight, advantageously at least 95.0% by weight, in particular at least 99% by weight, based in each case on the total weight of components E), F) and G), d) adding from 10.0 to 30.0 parts by weight of a third composition and polymerizing to a conversion of at least 85.0% by weight, preferably at least 90.0% by weight, advantageously at least 95.0% by weight, in particular at least 99% by weight, based in each case on the total weight of components H), I) and J), where the stated parts by weight give a total of 100.0 parts by weight.

For the purposes of the present invention, polymers here are compounds whose molecular weight is at least ten times that of the respective starting compounds A) to J), known as the monomer.

The progress of the polymerization reaction into each step may be followed in a known manner, for example gravimetrically or by means of gas chromatography.

The first composition comprises
A) from 50.0 to 99.9 parts by weight, advantageously from 60.0 to 99.9 parts by weight, preferably from 75.0 to 99.9 parts by weight, in particular from 85.0 to 99.5 parts by weight, of alkyl methacrylates having from 1 to 20, preferably from 1 to 12, in particular from 1 to 8, carbon atoms in the alkyl radical,
B) from 0.0 to 40.0 parts by weight, preferably from 0.0 to 24.9 parts by weight, in particular from 0.1 to 14.9 parts by weight, of alkyl acrylates having from 1 to 20, preferably from 1 to 12, in particular from 1 to 8, carbon atoms in the alkyl radical, C) from 0.1 to 10.0 parts by weight, preferably from 0.1 to 5.0 parts by weight, in particular from 0.1 to 2.0 parts by weight, of crosslinking monomers and D) from 0.0 to 8.0 parts by weight of styrenic monomers of the general formula (I)

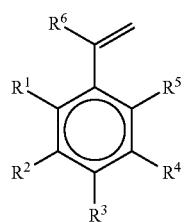

(I)

where the stated parts by weight preferably give a total of 100.0 parts by weight.

These compounds A), B), C) and D) are naturally different from one another, and in particular the compounds A) and B) encompass no crosslinking monomers C).

Each of the radicals $R^1$ To $R^5$, independently of the others, is hydrogen, a halogen, in particular fluorine, chlorine or bromine, or an alkyl group having from 1 to 6 carbon atoms, preferably hydrogen. The radical $R^6$ is hydrogen or an alkyl group having from 1 to 6 carbon atoms, preferably hydrogen. Particularly suitable alkyl groups having from 1 to 6 carbon atoms are methyl, ethyl, n-propyl, isopropyl, n-butyl, sec-butyl, tert-butyl, n-pentyl, n-hexyl groups, and cyclopentyl and cyclohexyl groups.

Styrenic monomers of the general formula (I) therefore encompass styrene, substituted styrenes having an alkyl substituent in the side chain, for example α-methyl-styrene and α-ethylstyrene, substituted styrenes having an alkyl substituent on the ring, for example vinyl-toluene and p-methylstyrene, halogenated styrenes. [sic] for example monochlorostyrenes, dichlorostyrenes, tribromostyrenes and tetrabromostyrenes.

The abovementioned alkyl methacrylates (A) are esters of methacrylic acid, for example methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates, for example cyclopentyl methacrylate, cyclohexyl methacrylate, 3-vinyl-2-butylcyclohexyl methacrylate, cycloheptyl methacrylate, cyclooctyl methacrylate, bornyl methacrylate and isobornyl methacrylate.

In one particularly preferred embodiment of the present invention, the first composition comprises, based on the total weight of components A) to D), at least 50% by weight, advantageously at least 60% by weight, preferably at least 75% by weight, in particular at least 85% by weight, of methyl methacrylate.

The abovementioned alkyl acrylates (B) are esters of acrylic acid, for example methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates, for example cyclopentyl acrylate, cyclohexyl acrylate, 3-vinyl-2-butylcyclohexyl acrylate, cycloheptyl acrylate, cyclooctyl acrylate, bornyl acrylate and isobornyl acrylate.

Crosslinking monomers (C) encompass all of the compounds which are capable, under the present polymerization conditions, of bringing about crosslinking. These include in particular (a) Difunctional (meth)acrylates, preferably compounds of the general formula:

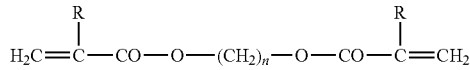

where R is hydrogen or methyl and n is a positive whole number greater than or equal to 2, preferably from 3 to 20, in particular di(meth)acrylates of propanediol, of butanediol, of hexanediol, of octanediol, of nonanediol, of decanediol, and of eicosanediol;

Compounds of the general formula:

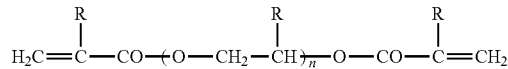

where R is hydrogen or methyl and n is a positive whole number from 1 to 14, in particular di(meth)acrylate of ethylene glycol, of diethylene glycol, of triethylene glycol, of tetraethylene glycol, of dodecaethylene glycol, of tetradecaethylene glycol, of propylene glycol, of dipropyl glycol and of tetradecapropylene glycol.

Glycerol di(meth)acrylate, 2,2'-bis[p-(γ-methacryloxy-β-hydroxypropoxy)phenylpropane] or bis-GMA, biphenol [sic] A dimethacrylate, neopentyl glycol di(meth)acrylate, 2,2'-di(4-methacryloxypolyethoxyphenyl)propane having from 2 to 10 ethoxy groups per molecule and 1,2-bis(3-methacryloxy-2-hydroxypropoxy)butane.

(b) Tri- or polyfunctional (meth)acrylates, in particular trimethylolpropane tri(meth)acrylate and pentaerythritol tetra (meth)acrylate.

(c) Graft crosslinking agents having at least two C—C double bonds of differing reactivity, in particular allyl methacrylate and allyl acrylate;

(d) aromatic crosslinking agents, in particular 1,2-divinylbenzene, 1,3-divinylbenzene and 1,4-divinylbenzene.

The manner of monomer selection or, respectively, of selection of the proportions by weight of the monomers A) to D) of the first composition is preferably such that the polymer obtainable by polymerization of the first monomer mixture has a glass transition temperature Tg of at least 10° C., preferably of at least 30° C. The glass transition temperature Tg of the polymer here can be determined in a known manner by differential scanning calorimetry (DSC). The glass transition temperature Tg may also be approximated by means of the Fox equation. According to Fox T. G., Bull. Am. Physics Soc. 1, 3, p. 123 (1956):

$$\frac{1}{Tg} = \frac{x_1}{Tg_1} + \frac{x_2}{Tg_2} + \ldots + \frac{x_n}{Tg_n}$$

where $x_n$ is the proportion by weight (% by weight/100) of the monomer n and $Tg_n$ is the glass transition temperature in Kelvin of the homopolymer of the monomer n. The person skilled in the art may obtain further useful information from Polymer Handbook $2^{nd}$ Edition, J. Wiley & Sons, New York (1975), which gives Tg values for the homopolymers most commonly encountered.

The second monomer mixture comprises

E) from 80.0 to 100.0 parts by weight, preferably from 92.0 to 98.0 parts by weight, of (meth)acrylates other than F)
F) from 0.05 to 10.0% parts by weight, preferably from 0.1 to 2.0% by weight, of crosslinking monomers and
G) 0.0 to 20.0 parts by weight, preferably from 8.0 to 20.0 parts by weight, of styrenic monomers of the general formula (I), where the stated parts by weight preferably give a total of 100.0 parts by weight.

These compounds E), F) and G) are naturally different from one another, and in particular the compounds E) encompass no crosslinking monomers F).

For the purposes of the present invention, (meth)acrylates are acrylates, methacrylates and mixtures of the two. They therefore encompass compounds which have at least one group of the following formula

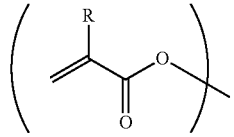

where R is hydrogen or a methyl radical. They include in particular the abovementioned alkyl acrylates and alkyl methacrylates. Other compounds which have proven particularly useful for the purposes of the present invention are arylalkyl acrylates, in particular benzyl, phenylethyl, phenylpropyl, phenylpentyl and/or phenylhexyl acrylate. The amount preferably used of these is in the range from 0.1 to 40.0% by weight, based on the total weight of components E) and F).

According to the invention, the crosslinking monomers F) encompass the abovementioned crosslinking monomers C).

For the purposes of one particularly preferred embodiment of the present invention, the second monomer mixture encompasses E) from 90.0 to 97.9 parts by weight of alkyl acrylates having from 3 to 8 carbon atoms in the alkyl radical and/or alkyl methacrylates having from 7 to 14 carbon atoms in the alkyl radical, in particular butyl acrylate and/or dodecyl methacrylate, F) from 0.1 to 2.0% by weight of crosslinking monomers and
G) from 0.0 to 20.0 parts by weight, preferably from 8.0 to 20.0 parts by weight of styrenic monomers of the general formula (I), where the parts by weight preferably give a total of 100.0 parts by weight.

The manner of monomer selection or, respectively, of selection of the proportions by weight of the monomers E), F) and G) of the second composition is advantageously such that the polymer obtainable by polymerization of the second composition has a glass transition temperature Tg of below 30° C., preferably below 10° C., in particular in the range from 0 to −75° C. The glass transition temperature Tg of the polymer here can be determined as mentioned above by differential scanning calorimetry (DSC) and/or approximated by the Fox equation.

The third composition comprises

H) from 50.0 to 100.0 parts by weight, advantageously from 60.0 to 100.0 parts by weight, particularly preferably from 75.0 to 100.0 parts by weight, in particular from 85.0 to 99.5 parts by weight, of alkyl methacrylates having from 1 to 20, preferably from 1 to 12, in particular from 1 to 8, carbon atoms in the alkyl radical,
I) from 0.0 to 40.0 parts by weight, preferably from 0.0 to 25.0 parts by weight and in particular from 0.1 to 15.0 parts by weight, of alkyl acrylates having from 1 to 20, preferably from 1 to 12, in particular from 1 to 8, carbon atoms in the alkyl radical,
J) from 0.0 to 10.0 parts by weight, preferably from 0.0 to 8.0% [sic] by weight, of styrenic monomers of the general formula (I), where the stated parts by weight preferably give 100.0 parts by weight in total.

In one particularly preferred embodiment of the present invention, the third composition comprises, based on the total weight of components H) to J), at least 50% by weight, advantageously at least 60% by weight, preferably at least 75% by weight, in particular at least 85% by weight, of methyl methacrylate.

The manner of monomer selection or, respectively, of selection of the proportions by weight of the monomers H), I) and J) of the third composition is advantageously such that the polymer obtainable by polymerization of the third composition has a glass transition temperature Tg of at least 10° C., preferably at least 30° C. The glass transition temperature Tg of the polymer here can be determined as mentioned above by differential scanning calorimetry (DSC) and/or approximated by the Fox equation.

In the process of the invention, the polymerization in steps b) to d) takes place at a temperature in the range from above 60 to below 90° C., advantageously in the range from above 70 to below 85° C., preferably in the range from above 75 to below 85° C.

The initiation takes place using the initiators commonly used for emulsion polymerization. Examples of suitable organic initiators are hydroperoxides, such as tert-butyl hydroperoxide or cumene hydroperoxide. Suitable inorganic initiators are hydrogen peroxide and the alkali metal and ammonium salts of peroxodisulphuric acid, in particular sodium peroxodisulphate and potassium peroxodisulphate. The initiators mentioned may be used either alone or else mixed. The amount preferably used of these is from 0.05 to 3.0% by weight, based on the total weight of the monomers of the respective stage.

The reaction mixture is stabilized by means of emulsifiers and/or protective colloids. Preference is given to stabilization by emulsifiers, in order to obtain low dispersion viscosity.

The total amount of emulsifier is preferably from 0.1 to 5% by weight, in particular from 0.5 to 3% by weight, based on the total weight of the monomers A) to J). Particularly suitable emulsifiers are anionic or non-ionic emulsifiers or mixtures of these, in particular:

- alkyl sulphates, preferably those having from 8 to 18 carbon atoms in the alkyl radical, alkyl and alkyl-aryl ether sulphates having from 8 to 18 carbon atoms in the alkyl radical and from 1 to 50 ethylene oxide units;
- sulphonates, preferably alkylsulphonates having from 8 to 18 carbon atoms in the alkyl radical, alkylarylsulphonates having from 8 to 18 carbon atoms in the alkyl radical, esters and half-esters of sulphosuccinic acid with monohydric alcohols or alkylphenols having from 4 to 15 carbon atoms in the alkyl radical; where appropriate, these alcohols or alkylphenols may also have been ethoxylated with from 1 to 40 ethylene oxide units;
- partial esters of phosphoric acid and the alkali metal and ammonium salts of these, preferably alkyl and alkyl-aryl phosphates having from 8 to 20 carbon atoms in the alkyl and, respectively, alkyl-aryl radical and from 1 to 5 ethylene oxide units;
- alkyl polyglycol ethers, preferably having from 8 to 20 carbon atoms in the alkyl radical and from 8 to 40 ethylene oxide units;
- alkyl-aryl polyglycol ethers, preferably having from 8 to 20 carbon atoms in the alkyl and, respectively, alkyl-aryl radical and from 8 to 40 ethylene oxide units;
- ethylene oxide-propylene oxide copolymers, preferably block copolymers, advantageously having from 8 to 40 ethylene oxide and, respectively, propylene oxide units.

According to the invention, preference is given to mixtures composed of anionic emulsifier and of non-ionic emulsifier. Mixtures which have proven very particularly successful here are those composed of an ester or half-ester of sulphosuccinic acid with monohydric alcohols or alkylphenols having from 4 to 15 carbon atoms in the alkyl radical, as anionic emulsifier, and of an alkyl polyglycol ether, preferably having from 8 to 20 carbon atoms in the alkyl radical and from 8 to 40 ethylene oxide units, as non-ionic emulsifier, in a ratio of from 8:1 to 1:8 by weight.

Where appropriate, the emulsifiers may also be used in a mixture with protective colloids. Suitable protective colloids encompass, inter alia, partially hydrolyzed polyvinyl acetates, polyvinylpyrrolidones, carboxymethyl-, methyl-, hydroxyethyl-, hydroxypropyl-cellulose, starches, proteins, poly(meth)acrylic acid, poly(meth)acrylamide, polyvinylsulphonic acids, melamine-formaldehydesulphonates, naphthalene-formaldehydesulphonates, styrene-maleic acid copolymers and vinyl ether-maleic acid copolymers. If use is made of protective colloids, the amount preferably used of these is from 0.01 to 1.0% by weight, based on the total amount of the monomers A) to I). The protective colloids may be used to form an initial charge prior to the start of the polymerization, or may be metered in.

The initiator may be used to form an initial charge or may be metered in. Another possibility, furthermore, is use of a portion of the initiator to form an initial charge and metering-in of the remainder.

The polymerization is preferably initiated by heating the reaction mixture to the polymerization temperature and by metering-in of the initiator, preferably in aqueous solution. The feeds of emulsifier and monomers may be separate or take the form of a mixture. If mixtures composed of emulsifier and monomer are metered in, the procedure comprises premixing emulsifer and monomer in a mixer installed upstream of the polymerization reactor. It is preferable for the remainder of emulsifier and the remainder of monomer which are not used to form an initial charge to be metered in separately from one another after the start of the polymerization. The feed is preferably begun from 15 to 35 minutes after the start of the polymerization.

For the purposes of the present invention, furthermore, it is particularly advantageous for the initial charge to comprise what is known as a "seed latex", which is preferably obtainable by polymerization of alkyl (meth)acrylates and moreover advantageously has a particle radius in the range from 3.0 to 20.0 nm, advantageously [sic] in the range from 5.0 to 20.0 nm. These small radii may be calculated after a defined polymerization onto the seed latex, during which a shell is built up around the seed latex, and measuring the radii of the resultant particles by the Coulter method. This method of particle size determination, known from the literature, is based on measurement of the electrical resistance, which changes in a characteristic manner when particles pass through a narrow measuring aperture. Further details may be found in Nachr. Chem. Tech. Lab. 43, 553-566 (1995), for example.

The monomer constituents of the actual core, i.e. the first composition, are added to the seed latex, preferably under conditions such that the formation of new particles is avoided. The result of this is that the polymer formed in the first stage of the process is deposited in the form of a shell around the seed latex. Similarly, the monomer constituents of the first shell material (second composition) are added to the emulsion polymer under conditions such that the formation of new particles is avoided. The result of this is that the polymer formed in the second stage is deposited in the form of a shell around the existing core. This procedure is to be repeated appropriately for each further shell.

In another preferred embodiment of the present invention, the core-shell particles of the invention are obtained by an emulsion polymerization process in which, instead of the seed latex, a long-chain aliphatic alcohol, preferably having from 12 to 20 carbon atoms, emulsified, is used to form an initial charge. In one preferred embodiment of this process, the long-chain aliphatic alcohol used comprises stearyl alcohol. Similarly to the procedure described above, the core-shell structure is obtained by stepwise addition and polymerization of the corresponding monomers, avoiding the formation of new particles. The person skilled in the art can find further details on the polymerization process in the Patent Specifications DE 3343766, DE 3210891, DE 2850105, DE 2742178 and DE 3701579.

However, for the purposes of the present invention, irrespective of the specific procedure, it has proven very particularly advantageous for the second and the third monomer mixture to be metered in as required by consumption.

The chain length, in particular of the (co)polymers of the second shell (third composition) may be adjusted via polymerization of the monomer or of the monomer mixture in the presence of molecular weight regulators, in particular of the mercaptans known for this purpose, for example n-butyl mercaptan, n-dodecyl mercaptan, 2-mercaptoethanol or 2-ethylhexyl thioglycolate, pentaerythritol tetrathioglycolate; the amounts used of the molecular weight regulators generally being from 0.05 to 5% by weight, based on the monomer mixture, preferably from 0.1 to 2% by weight and particularly preferably from 0.2 to 1% by weight, based on the monomer mixture (cf., for example, H. Rauch-Puntigam, Th. Völker, "Acryl- and Methacrylverbindungen" [Acrylic and methacrylic compounds], Springer, Heidelberg, 1967; Houben-Weyl, Methoden der organischem Chemie [Methods of organic chemistry], Vol. XIV/1. p. 66, Georg Thieme, Heidelberg, 1961 or Kirk-Othmer, Encyclopedia of Chemical Technology, Vol. 1, pp. 296 et seq., J. Wiley, New York, 1978). The molecular weight regulator used preferably comprises n-dodecyl mercaptan.

After conclusion of the polymerization, post-polymerization may be carried out for residual monomer removal, using known methods, for example using initiated post-polymerization.

Since the process of the invention is particularly suitable for preparing aqueous dispersions with high solids content above 50% by weight, based on the total weight of the aqueous dispersion, the manner of selection of the relative proportions of all of the substances is such that the total weight of components A) to J), based on the total weight of the aqueous dispersion, is above 50.0% by weight, advantageously above 51.0% by weight, preferably above 52.0% by weight. The substances to be taken into account in this connection also include, besides the monomers A) to J), all of the other substances used, for example water, emulsifier, initiator, where appropriate regulators and protective colloids, etc.

For the purposes of the present invention it is moreover particularly advantageous for the selection of the relative proportions of all of the components to be such as to give core-shell particles with an overall radius, measured by the Coulter method, in a range from 150.0 to below 250.0 nm, preferably in the range from 170.0 to 220.0 nm.

The aqueous dispersions obtainable by the process of the invention feature a low coagulate content which, based on the total weight of the aqueous dispersion, is preferably less than 5.0% by weight, advantageously less than 3.0% by weight, in particular less than 1.5% by weight. In one particularly preferred embodiment of the present invention, the aqueous dispersion comprises, based on its total weight, less than 1.0% by weight, preferably less than 0.5% by weight, advantageously less than 0.25% by weight, in particular 0.10% by weight or less, of coagulate.

The term "coagulate" in this connection means water-insoluble constituents, which may preferably be filtered off by filtering the dispersion advantageously through a filter ruffle in which a No. 0.90 DIN 4188 filter fabric has been fixed.

The core-shell particle of the invention may be obtained from the dispersion for example by spray drying, freeze coagulation, precipitation by electrolyte addition or by exposure to mechanical or thermal stress, where the latter can be carried out by means of a vented extruder according to DE 27 50 682 A1 or U.S. Pat. No. 4,110,843. The process of spray drying is the most commonly used, but the other processes mentioned have the advantage that they provide at least some separation of the water-soluble polymerization auxiliaries from the polymer.

The core-shell particle of the invention serves to improve the notched impact strength of rigid thermoplastics which are compatible with the hard phase, preferably of poly(meth)acrylate moulding compositions, in particular of polymethyl methacrylate.

The poly(meth)acrylate moulding compositions preferably comprise other polymers for suitable modification of properties. These include in particular polyacrylonitriles, polystyrenes, polyethers, polyesters, polycarbonates and polyvinyl chlorides. These polymers may be used individually or as a mixture, and for the purposes of one very particularly preferred embodiment of the present invention here, copolymers which are derivable from the above-mentioned polymers are added to the moulding compositions. These include in particular styrene-acrylonitrile copolymers (SAN), which are preferably added to the moulding compositions in an amount of up to 45% by weight.

Particularly preferred styrene-acrylonitrile copolymers may be obtained by polymerizing mixtures which are composed of
from 70.0 to 92.0% by weight of styrene
from 8.0 to 30.0% by weight of acrylonitrile and
from 0.0 to 22.0% by weight of other comonomers, based
in each case on the total weight of the monomers to be polymerized.

From 10 to 60 parts of the impact-modifying agent are generally admixed with 100 parts of the moulding composition to be modified.

According to the invention, particularly preferred moulding composition [sic] comprise, based in each case on its total weight:
A) from 1.0 to 50.0% by weight of at least one core-shell particle according to at least one of Claims 1 to 9;
B) from 1.0 to 99.0% by weight of at least one (meth)acrylic polymer,
C) from 0.0 to 45.0% by weight, preferably from 1.0 to 45% by weight, of styrene-acrylonitrile copolymers and
D) from 0.0 to 10.0% by weight of other additives
where the percentages by weight give 100.0% by weight in total.

The (meth)acrylic polymer here preferably encompasses, based in each case on its total weight,
a) from 50.0 to 100.0% by weight, advantageously from 60.0 to 100.0% by weight, particularly preferably from 75.0 to 100.0% by weight, in particular from 85.0 to 99.5% by weight, of alkyl methacrylate repeat units having from 1 to 20, preferably from 1 to 12, advantageously from 1 to 8, in particular from 1 to 4, carbon atoms in the alkyl radical,
b) from 0.0 to 40.0% by weight, preferably from 0.0 to 25.0% by weight, in particular from 0.1 to 15.0% by weight, of alkyl acrylate repeat units having from 1 to 20, preferably from 1 to 12, advantageously from 1 to 8, in particular from 1 to 4, carbon atoms in the alkyl radical and
c) from 0.0 to 8.0% by weight of styrenic repeat units of the general formula (I),
where the percentages by weight give a total of 100.0% by weight.

According to one particularly preferred embodiment of the present invention, the (meth)acrylic polymer comprises, based on its total weight, at least 50.0% by weight, advantageously at least 60.0% by weight, preferably at least 75.0% by weight, in particular at least 85.0% by weight of methyl methacrylate repeat units.

The (meth)acrylic polymer moreover preferably has a number-average molar mass in the range from 1000 to 100 000 000 g/mol, preferably in the range from 10 000 to 1 000 000 g/mol, in particular in the range from 50 000 to 500 000 g/mol. This molar mass may be determined by gel permeation chromatography, for example, with calibration based on polystyrene.

Mixtures of this type may be prepared in various ways. For example, the dispersion of the core-shell particle may be mixed with an aqueous dispersion of the blend component, and the mixture may be coagulated, the aqueous phase separated off, and the coagulate melted to give a moulding composition. This process can achieve particularly homogeneous mixing of the two materials. The components may also be prepared separately and isolated and, in the form of their melts or in the form of powders or pellets, mixed and homogenized in a multiscrew extruder or on a roll mill.

Conventional additives may be admixed at any processing stage suitable for this purpose. These include dyes, pigments, fillers, reinforcing fibres, lubricants, UV stabilizers, etc.

For the purposes of one very particularly preferred embodiment of the present invention, the moulding composition comprises, based in each case on its total weight, from 0.1 to 10% by weight, preferably from 0.5 to 5.0% by weight, in particular from 1.0 to 4.0% by weight, of another polymer (AP) whose weight-average molecular weight is higher than that of the (meth)acrylic polymer by at least 10%, preferably at least 50%, in particular at least 100%. The molecular weight here may be determined by gel permeation chromatography, for example, with calibration based on polystyrene.

According to the invention, particularly suitable polymers (AP) preferably encompass, based in each case on their total weight,
a) from 50.0 to 100.0% by weight, advantageously from 60.0 to 100.0% by weight, particularly preferably from 75.0 to 100.0% by weight, in particular from 85.0 to 99.5% by weight, of alkyl methacrylate repeat units having from 1 to 20, preferably from 1 to 12, advantageously from 1 to 8, in particular from 1 to 4, carbon atoms in the alkyl radical,
b) from 0.0 to 40.0% by weight, preferably from 0.0 to 25.0% by weight, in particular from 0.1 to 15.0% by weight, of alkyl acrylate repeat units having from 1 to 20, preferably from 1 to 12, advantageously from 1 to 8, in particular from 1 to 4, carbon atoms in the alkyl radical and
c) from 0.0 to 8.0% by weight of styrenic repeat units of the general formula (I),
where the percentages by weight give a total of 100.0% by weight.

In one particularly preferred embodiment of the present invention, the polymer (AP) comprises, based on its total weight, at least 50.0% by weight, advantageously at least 60.0% by weight, preferably at least 75.0% by weight, in particular at least 85.0% by weight of methyl methacrylate repeat units.

The polymer (AP) moreover preferably has a weight-average molar mass in the range from 10 000 to 100 000 000 g/mol, preferably in the range from 50 000 to 5 000 000 g/mol, advantageously in the range from 100 000 to 1 000 000 g/mol, in particular in the range from 250 000 to 600 000 g/mol. This molecular weight may be determined for example by gel permeation chromatography with calibration based on polystyrene.

Blends of the core-shell particles, in particular with polymethyl methacrylate, are particularly suitable for producing mouldings, advantageously with a wall thickness above 1 mm, for example extruded webs of thickness of from 1 to 10 mm which give good results in a stamping process and can be used, for example, to produce printable panels for electrical devices, or for producing high-quality injection mouldings, e.g. motor vehicle windscreens. They can also be used to produce relatively thin films, for example of thickness 50 μm.

The mouldings obtainable according to the invention preferably feature
a Vicat softening point ISO 306 (B50) of at least 85° C., preferably of at least 90° C. and particularly preferably of at least 93° C.,
the Charpy notched impact strength (ISO 179) of at least 6.0 kJ/m² at 23° C., and preferably of at least 2.5 kJ/m², in particular of at least 2.5 [sic] kJ/m², at −10° C. and
a modulus of elasticity to ISO 527-2 of at least 1500 MPa
a haze to ASTM D 1003 (1997) which is preferably at most 2.5%,
a melt viscosity to DIN 54811 (1984) above 2000 Pa s and advantageously below 4500 Pa s,
a transmittance (D 65/10°) to DIN 5033/5036 of at least 88.5% and
a die swell to DIN 54811 (1984) in the range from 0 to 20%.

For the purposes of one particularly preferred embodiment of the present invention, the mouldings of the invention are used as a mirror housing or a spoiler on a motor vehicle, as a pipe, or as a protective covering or as a component of a refrigerator.

The following inventive examples and comparative examples serve for illustration of the present invention, but there is no intention that there be any resultant restriction of the concept of the invention.

I. Core-Shell Particles
A. Preparation of Seed Latex
A seed latex was prepared by emulsion polymerization of a monomer composition comprising 98% by weight of ethyl acrylate and 2% by weight of allyl methacrylate. The content of these particles in water was about 10% by weight, their diameter being about 20 nm.

B. Preparation of Core-Shell Particles
The synthesis of the core-shell particles described below took place according to preparation process A (inventive examples B1 and B2), B (comparative examples VB1 and VB2), C (comparative examples VB3 and VB4 according to U.S. Pat. No. 3,793,402) or D (comparative examples VB5, VB6 and VB7 according to DE 41 36 993). Use was made here of the emulsions I to III given in table 1.

B.1 Preparation Process A (Inventive Examples)
19.416 kg of water were used to form an initial charge by stirring at 83° C. (internal vessel temperature) in a polymerization vessel. 16.2 g of sodium carbonate and 73 g of seed latex were added. Emulsion I was then metered in over a period of 1 h. 10 min after the end of the input of emulsion I, emulsion II was metered in over a period of about 2 h. Then, about 90 min after the end of input of emulsion II, emulsion III was metered in over a period of about 1 h. 30 min after the end of input of emulsion III, the mixture was cooled to 30° C.

To separate the core-shell particles, the dispersion was frozen at 20° C. for 2 d, then thawed again, and the coagulated dispersion was separated by way of a filter fabric. The solid was dried at 50° C. in a drying cabinet (duration: about 3 d). Further details can be found in table 1.

The particle size of the core-shell particles (see table 2) was determined with the aid of a Coulter N4 device, these measurements being made on the particles in dispersion.

B.2 Preparation Process B (Comparative Examples VB1 and VB2)
20.129 kg of water were used to form an initial charge by stirring at 52° C. (internal vessel temperature) in a polymerization vessel, and 1.18 g of acetic acid, 0.04 g of ferrous (II) sulphate, 12.9 g of sodium disulphite and 121.5 g of seed latex were added. Emulsion I was then metered in over a period of 1.5 h. 10 min after the end of input of emulsion I, 38.8 g of sodium disulphite dissolved in 1176 g of water were added, and emulsion II was metered in over a period of about 2.5 h. Then, about 30 min after the end of input of emulsion II, 12.9 g of sodium disulphite dissolved in 588.2 g of water were added and emulsion III was added over a period of about 1.5 h. 30 min after the end of input of emulsion III, the mixture was cooled to 30° C. and adjusted to pH=8, using sodium carbonate.

Any attempt to achieve a solids content higher than 48% by weight for the resultant dispersion resulted in observation of an increased amount of coagulate (>1% by weight of the dispersion).

To separate the core-shell particles, the dispersion was frozen at −20° C. for 2 d, then thawed again, and the coagulated dispersion was separated off by way of a filter fabric. The solid was dried at 50° C. in a drying cabinet (duration: about 3 d). Further details are found in table 1.

The particle size of the core-shell particles (see table 2) was determined with the aid of a Coulter N4 device, the measurements being made on the particles in dispersion.

B.3 Preparation Process C (Comparative Examples According to U.S. Pat. No. 3,793,402)

The preparation for comparative examples VB3 and VB4 took place in a manner substantially similar to that for Example 1 of U.S. Pat. No. 3,793,402. Only the monomer ratio for the first shell was adapted to that of the inventive examples, and the dispersions were prepared with the aid of a "triple-batch", i.e. the monomers for the core, the first and the second shell were respectively added all at once and then polymerized to completion. Further details of the synthesis can be found in tables 3 to 6. The resultant solids contents and coagulate contents are given in table 7. To determine coagulate content here, the entire dispersion was filtered through a VA filter sleeve in which a No. 0.90 DIN 4188 screen fabric has been fixed. The resultant residue is rinsed with water until the aqueous run-off was clear. To the extent that coagulate resulted, this was pressed dry with a spatula, placed in a previously tared glass beaker, and weighed on a laboratory balance to an accuracy of 0.1 g. The filtrate was likewise weighed on the laboratory balance to an accuracy of 1 g. The weight of the entire dispersion is calculated from weight of coagulate and weight of filtrate.

Coagulate(% by weight)=100×[weight of resultant coagulate (g)]/[weight of entire dispersion (g)]

The radii of the resultant core-shell particles and their particle size distribution are given in table 8. In this case the particle size was characterized both by means of a Coulter N4 device and by means of an analytical ultracentrifuge. The particle size distribution (PSD) is also determined by means of the analytical ultracentrifuge. The sizes given in table 8 are defined as:

R10, R50, R90: radius greater than that of 10, 50 and, respectively, 90% by weight of the core-shell particles in the dispersion P80: =(R90−R10)/R50 (measure of PSD uniformity−covers 80% by weight of the core-shell particles)

B.4 Preparation Process D (Comparative Examples According to DE 41 36 993)

The preparation for comparative examples VB5, VB6 and VB7 was substantially in accordance with Example 1 of DE 41 36 993. However, the amount of emulsion used to form an initial charge was reduced from 30 to 20% by weight, in order to adjust the particle size of the dispersions to those of the inventive examples. In addition, an aqueous initiator solution was metered in in the final stage. Further details of the synthesis are found in tables 3 to 6, and the characteristic parameters are given in tables 7 and 8 and are compared with polymer B1.

C. Preparation of a Blended Dispersion

The blended dispersion (solids content about 50% by weight) is prepared by way of an emulsion polymerization, and its monomer composition is 95% by weight of methyl methacrylate and 5% by weight of ethyl acrylate. The particle size of the particles is 260 nm in diameter (measured in the Coulter N4 tester), and the J value of the polymer (measure of molecular weight) is 203 mL/g (measured in chloroform at a temperature of 25° C., DIN ISO 1628-6)

II. Moulding Compositions

A. Blending of Moulding Compositions

A moulding composition based on polymethyl methacrylate, PLEXIGLAS® 7 N (Röhm GmbH & Co. KG, Darmstadt) was blended with the respective core-shell particles by means of an extruder. The compositions for the individual inventive examples and comparative examples are documented in table 9.

B. Testing of Moulding Compositions

Test specimens were produced from the blended moulding compositions. The moulding compositions and, respectively, the corresponding test specimens were tested according to the following measuring methods:

melt viscosity $\eta s$ (220° C./5 MPa): DIN 54811 (1984)

die swell B: DIN 54811 (1984)

Vicat softening point (16 h/80° C.): DIN 1SO [sic] 306 (August 1994)

Izod notched impact strength: ISO 180 (1993)

Charpy notched impact strength: ISO 179 (1993)

modulus of elasticity: ISO 527-2 transmittance (D 65/10°): DIN 5033/5036 haze (BYK Gardner Hazegard-plus haze meter): ASTM D 1003 (1997)

The results of the tests are likewise shown in table 2.

The advantages of the blends A, B, C and D of the invention over the conventionally impact-modified moulding compositions (VB A and VB B) are clearly seen:

At comparable content of the core-shell particles (<40% by weight), the Charpy notched impact strength of the moulding compositions of the invention at 23° C. is significantly higher than that of the comparative moulding compositions, and is at a comparable level at −10° C. The optical properties (haze, transmission), the rheological properties (viscosity of the melt, widening of the melt flow) and the mechanical properties (module of elasticity) are on a comparable level.

TABLE 1

Composition of individual emulsions (all amounts in [g])

|  | VB1 | VB2 | B1 | B2 |
|---|---|---|---|---|
| Emulsion I |  |  |  |  |
| Water | 8823.5 | 8823.5 | 8109.65 | 8109.65 |
| Sodium persulphate |  |  | 8.24 | 8.24 |
| Potassium persulphate | 9.4 | 9.4 |  |  |
| Aerosol OT 75 | 82.4 | 82.4 | 65.88 | 65.88 |
| Methyl methacrylate | 8622.0 | 8276.1 | 14216.72 | 14216.72 |
| Ethyl acrylate |  | 345.9 | 593.60 | 593.60 |
| Allyl methacrylate | 25.9 | 25.9 | 29.68 | 29.68 |
| Emulsion II |  |  |  |  |
| Water | 7140 | 7140 | 7081.18 | 7081.18 |
| Sodium persulphate |  |  | 18.59 | 18.59 |
| Potassium persulphate | 28.2 | 28.2 |  |  |
| Aerosol OT 75 | 82.4 | 82.4 | 84.71 | 84.71 |
| Butyl acrylate | 14438 | 14438 | 15454.8 | 15454.8 |
| Styrene | 3004.2 | 3004.2 | 3453.48 | 3453.48 |
| Allyl methacrylate | 229.74 | 229.74 | 171.72 | 171.72 |
| Emulsion III |  |  |  |  |
| Water | 4542.4 | 4542.4 | 2992.59 | 2992.59 |
| Sodium persulphate |  |  | 8.24 | 8.24 |
| Potassium persulphate | 8.8 | 8.8 |  |  |
| Aerosol OT 75 | 15.3 | 15.3 | 10.59 | 10.59 |
| Methyl methacrylate | 10828.8 | 10828.8 | 7632 | 7632 |
| Ethyl acrylate | 451.2 | 451.2 | 848 | 848 |
| Dodecyl mercaptan | 39.5 | 39.5 |  |  |

TABLE 2

Test results from impact-modified moulding compositions

| Blend | VB A | VB B | A | B | C | D |
|---|---|---|---|---|---|---|
| Core-shell particles | VB1 | VB2 | B1 | B1 | B2 | B2 |
| Particle radius [nm] | | | 188 | 188 | 164 | 164 |
| Content of core-shell particles in Plexiglas ® 7N [% by weight] | 39.3 | 39.3 | 38.4 | 35.7 | 38.4 | 38.4 |
| Viscosity ηs [Pa s] | 2120 | 2780 | 3210 | 3060 | 3210 | 3600 |
| Die swell B [%] | 21.4 | 11.0 | 3.8 | 6.9 | 5.6 | 12.6 |
| Vicat softening point [° C.] | 99.8 | 95.5 | 95.6 | 96.2 | 94.9 | 95 |
| Izod notched impact strength | | | | | | |
| 23° C.: [kJ/m$^2$] | | | 6.2 | 6.1 | 6.4 | 6.0 |
| −10° C.: [kJ/m$^2$] | | | 4.1 | 3.5 | 3.6 | 3.7 |
| Charpy notched impact strength | | | | | | |
| 23° C.: [kJ/m$^2$] | 5.2 | 6.0 | 7.4 | 6.7 | | |
| −10° C.: [kJ/m$^2$] | 2.0 | 2.9 | 3.9 | 2.7 | | |
| Modulus of elasticity [MPa] | 2180 | 1805 | 1660 | 1900 | | |
| Transmittance [%] | 89.1 | 88.7 | 90.5 | | 90.7 | 90.9 |
| Haze | | | | | | |
| 23° C.: [%] | 1.2 | 1.3 | 2.3 | 2.0 | 1.8 | 1.6 |
| 40° C.: [%] | 5.43 | 5.39 | 5.8 | 5.8 | 4.7 | 4.7 |

*with blended dispersion (3% by weight of the solid in the blended dispersion based on the solid in the dispersion)

TABLE 3

Structure of core-shell particles

| | VB3 | VB4 | VB5 | VB6 | VB7 | B1 |
|---|---|---|---|---|---|---|
| Core | 25.05 | 25.05 | 20 | 20 | 20 | 35 |
| 1$^{st}$ shell | 50.5 | 50.5 | 50 | 50 | 50 | 45 |
| 2$^{nd}$ shell | 25 | 25 | 30 | 30 | 30 | 20 |

TABLE 4

Composition of core

| | VB3 | VB4 | VB5 | VB6 | VB7 | B1 |
|---|---|---|---|---|---|---|
| Methyl methacrylate | 99.8 | 99.8 | 98.6 | 98.6 | 98.6 | 95.8 |
| Methyl acrylate | | | 0.87 | 0.87 | 0.87 | |
| Ethyl acrylate | | | | | | 4.0 |
| Allyl methacrylate | 0.2 | 0.2 | 0.52 | 0.52 | 0.52 | 0.2 |

TABLE 5

Composition of 1$^{st}$ shell

| | VB3 | VB4 | VB5 | VB6 | VB7 | B1 |
|---|---|---|---|---|---|---|
| Butyl acrylate | 81.1 | 81.1 | 80.1 | 80.1 | 80.1 | 81.0 |
| Styrene | 17.9 | 17.9 | 18.9 | 18.9 | 18.9 | 18.1 |
| Allyl methacrylate | 1.0 | 1.0 | 1.0 | 1.0 | 1.0 | 0.9 |

TABLE 6

Composition of 2$^{nd}$ shell

| | VB3 | VB4 | VB5 | VB6 | VB7 | B1 |
|---|---|---|---|---|---|---|
| Methyl methacrylate | 96.0 | 96.0 | 96 | 96 | 96 | 90 |
| Ethyl acrylate | 4.0 | 4.0 | 4 | 4 | 4 | 10 |
| Dodecyl mercaptan | | | | | | |

TABLE 7

Solids content and coagulate content

| | VB3 | VB4 | VB5 | VB6 | VB7 | B1 |
|---|---|---|---|---|---|---|
| Solids content$^+$ [% by wt.] | 46.3 | 53 | 50.2 | 50.2 | 53 | 53 |
| Coagulate content$^+$ [% by wt.] | 0.2 | >25 | 0.12 | 0.16 | 20 | 0.1 |

$^+$based in each case on the total weight of the dispersion

TABLE 8

Particle radii

| | VB3 | VB4 | VB5 | VB6 | VB7 | B1 |
|---|---|---|---|---|---|---|
| R10$^1$ [nm] | 172 | | 113 | 133 | | 165 |
| R50$^1$ [nm] | 163 | | 123 | 145 | | 180 |
| R90$^1$ [nm] | 166 | | 145 | 168 | | 202 |
| P80$^1$ | 0.08 | | 0.26 | 0.25 | | 0.21 |
| Particle radius$^2$ [nm] | 191 | | 128 | 162 | | 188 |
| Particle radius$^2$ of seed latices and, respectively, fully polymerized initial-charge emulsion [nm] | | | 59 | 64 | | 10 |

$^1$ultracentrifuge
$^2$measured using Coulter N4

The invention claimed is:

1. A process for preparing an aqueous polymer dispersion, by
   a) preparing an initial charge of an aqueous emulsion of a long chain alkyl alcohol or a seed latex by polymerization of an alkyl (meth)acrylate in an aqueous medium comprising an emulsifier to a seed particle radius ranging from 3.0 to 20.0 nm
   b) adding from 25.0 to 45.0 parts by weight of a first composition comprising:
      A) from 50.0 to 99.9 parts by weight of an alkyl (meth) acrylate having from 1 to 20 carbon atoms in the alkyl radical,
      B) from 0.0 to 40.0 parts by weight of an alkyl acrylate having from 1 to 20 carbon atoms in the alkyl radical,
      C) from 0.1 to 10.0 parts by weight of a crosslinking monomer, and
      D) from 0.0 to 8.0 parts by weight of a styrenic monomer of the formula (I)

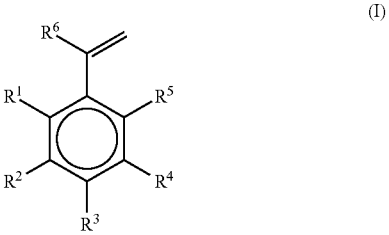

(I)

where each of the radicals $R^1$ to $R^5$, independently of the others, is hydrogen, a halogen, a $C_{1-6}$-alkyl group or a $C_{2-6}$-alkenyl group, and the radical $R^6$ is hydrogen or an alkyl group having from 1 to 6 carbon atoms, emulsified in water with an emulsifier, to said aqueous emulsion or seed latex, and
polymerizing the added monomers to a conversion of at least 85.0% by weight, based on the total weight of components A), B), C) and D), c) adding from 35.0 to 55.0 parts by weight of a second composition comprising
   E) from 80.0 to 100.0 parts by weight of a (meth)acrylate,
   F) from 0.05 to 10.0 parts by weight of a crosslinking monomer, and
   G) from 0.0 to 20.0 parts by weight of a styrenic monomer of the formula (I), emulsified in water with an emulsifier, to the aqueous polymer emulsion of step (b), and
   polymerizing the added monomers to a conversion of at least 85.0% by weight, based on the total weight of components E), F) and G),
d) adding from 10.0 to 30.0 parts by weight of a third composition comprising:
   H) from 50.0 to 100.0 parts by weight of an alkyl (meth)acrylate having from 1 to 20 carbon atoms in the alkyl radical,
   I) from 0.0 to 40.0 parts by weight of an alkyl acrylate having from 1 to 20 carbon atoms in the alkyl radical, and
   J) from 0.0 to 10.0 parts by weight of a styrenic monomer of the formula (I), emulsified in water with an emulsifier, to the aqueous polymer emulsion of step (c),
   and polymerizing to a conversion of at least 85.0% by weight, based on the total weight of components H), I) and J),
where the parts by weight given for the compositions b), c) and d) give a total of 100.0 parts by weight,
wherein
e) each polymerization is carried out at a temperature in the range from above 60 to below 90° C. and
f) the relative proportions of all of the substances are selected in such a way that the total weight of components A) to J), based on the total weight of the aqueous dispersion, is greater than 50.0% by weight, the product particles have a particle size ranging from 150 to less than 250 nm, and the amount of coagulate in the dispersion is 0.1% or less by wt, based on the total weight of the dispersion.

2. The process according to claim 1, wherein the initial charge comprises from 90.00 to 99.99 parts by weight of water and from 0.01 to 10.00 parts by weight of emulsifier, where the parts by weight of said amounts give a total of 100.00 parts by weight.

3. The process according to claim 1, wherein said emulsifier is an anionic or nonionic emulsifier.

4. The process according to claim 1, wherein said initial charge is said seed latex.

5. The process according to claim 1, wherein a seed latex whose particle radius, measured by the Coulter method, is in the range from 5.0 to 20.0 nm is used to form an initial charge.

6. The process according to claim 1, wherein said initial charge is an aqueous emulsion of said long chain alkyl alcohol having from 12 to 20 carbon atoms in the alkyl radical.

7. The process according to claim 1, wherein the polymerization in steps b) to d) is initiated with a peroxodisulphate.

8. The process according to claim 7, wherein the peroxidisulphate is ammonium and/or alkali metal peroxodisulphate.

9. The process according to claim 1, wherein the relative proportions of all of the substances are selected in such a way that core-shell particles are obtained with an overall radius, measured by the Coulter method, in the range from 150.0 to less than 250.0 nm.

10. The process according to claim 1, wherein the second and the third monomer mixture are metered in as required by consumption.

* * * * *